(12) United States Patent
Berkebile et al.

(10) Patent No.: US 10,052,572 B2
(45) Date of Patent: Aug. 21, 2018

(54) UNDERDRAIN FILTER BLOCK

(71) Applicant: Xylem Water Solutions Zelienople LLC, Zelienople, PA (US)

(72) Inventors: Dean T. Berkebile, Cranberry Township, PA (US); Daniel E. Bruce, Murrysville, PA (US); Christopher J. Ball, Cranberry Township, PA (US)

(73) Assignee: XYLEM WATER SOLUTIONS ZELIENOPLE LLC, Zelienople, PA (US)

( * ) Notice: Subject to any disclaimer, the term of this patent is extended or adjusted under 35 U.S.C. 154(b) by 242 days.

(21) Appl. No.: 14/527,114

(22) Filed: Oct. 29, 2014

(65) Prior Publication Data

US 2015/0196858 A1    Jul. 16, 2015

Related U.S. Application Data

(62) Division of application No. 12/983,465, filed on Jan. 3, 2011, now Pat. No. 8,889,003.

(60) Provisional application No. 61/295,891, filed on Jan. 18, 2010.

(51) Int. Cl.
*B01D 24/24* (2006.01)
*B01D 24/00* (2006.01)
*B01D 24/46* (2006.01)

(52) U.S. Cl.
CPC ............ *B01D 23/24* (2013.01); *B01D 24/24* (2013.01); *B01D 24/4631* (2013.01)

(58) Field of Classification Search
CPC ........ B01D 24/14; B01D 24/24; B01D 23/24; B01D 24/4631
See application file for complete search history.

(56) References Cited

U.S. PATENT DOCUMENTS

| | | |
|---|---|---|
| 2,378,239 A | 6/1945 | Myron |
| 2,873,857 A | 2/1959 | Scheid |
| 3,110,667 A | 11/1963 | Stuppy |
| 3,615,019 A | 10/1971 | Early, Jr. |
| 3,762,559 A | 10/1973 | Knoy et al. |
| 3,956,134 A | 5/1976 | Sturgill |
| 4,065,391 A | 12/1977 | Farabaugh |
| 4,331,542 A | 5/1982 | Emrie |
| 4,619,765 A | 10/1986 | Roberts |
| 5,019,259 A | 5/1991 | Hambley |
| 5,030,343 A | 7/1991 | Urriola |
| 5,108,627 A | 4/1992 | Berkebile et al. |
| 5,160,614 A | 11/1992 | Brown |
| 6,090,284 A | 7/2000 | Melber et al. |
| 6,110,366 A | 8/2000 | Hunkele et al. |
| 6,143,188 A | 11/2000 | Jantsch, Sr. et al. |

(Continued)

FOREIGN PATENT DOCUMENTS

| | | |
|---|---|---|
| CN | 2145060 Y | 11/1993 |
| JP | 5277306 A | 10/1993 |

(Continued)

*Primary Examiner* — Matthew O Savage
(74) *Attorney, Agent, or Firm* — The Webb Law Firm

(57) ABSTRACT

An underdrain filter block includes a top wall, a pair of side walls extending from the top wall, a bottom wall extending between the pair of side walls, first and second ribs, and a wall segment extending between the first rib and the second rib to define a grout chamber configured to receive grout during installation of the underdrain filter block.

18 Claims, 6 Drawing Sheets

(56) References Cited

U.S. PATENT DOCUMENTS

| | | | |
|---|---|---|---|
| 6,306,341 B1 | 10/2001 | Bergmann et al. | |
| 6,740,237 B1 | 5/2004 | Roberts et al. | |
| 9,072,990 B2 * | 7/2015 | Berkebile | B01D 24/24 |
| 2007/0190865 A1 | 8/2007 | Slack et al. | |
| 2008/0000825 A1 | 1/2008 | Roberts et al. | |

FOREIGN PATENT DOCUMENTS

| | | |
|---|---|---|
| JP | 2010234343 A | 10/2010 |
| KR | 200398755 Y1 | 10/2005 |

* cited by examiner

UNDERDRAIN FILTER BLOCK

CROSS-REFERENCE TO RELATED APPLICATION

This application is a divisional of U.S. application Ser. No. 12/983,465 filed on Jan. 3, 2011, which claims the benefit of U.S. Provisional Application No. 61/295,891, filed Jan. 18, 2010. The disclosure of each of these documents is hereby incorporated in its entirety by reference.

BACKGROUND OF THE INVENTION

Field of the Invention

The present invention relates to an underdrain filter block and, more particularly, to a filter block used in draining and backwashing a filtering media in a filter bed and a method of securing the filter block to the filter floor.

Description of Related Art

Underdrain filter blocks provide a filter bottom by assembling a number of filter blocks together to provide an upper surface for supporting a filter media. The filter bottom upper surface is provided with openings to allow the flow of filtered liquid from the filter media to pass into the filter bottom where conduits carry the filtered liquid from the filter. The conduits also serve to provide backwashing fluids, such as gas or liquid, or both, to the filter media for cleaning. U.S. Pat. No. 5,108,627 to Berkebile et al. discloses a filter underdrain block and is hereby incorporated by reference in its entirety.

Generally, conventional underdrain filter blocks are susceptible to uplift failure due to an internal pressure caused by headloss through the underdrain. The headloss, or internal pressure of the conventional underdrain blocks, tends to force the block off the filter floor as a bottom section of the underdrain block deflects or deforms from internal pressure.

U.S. Pat. No. 3,956,134 to Sturgill discloses, as shown in FIGS. 5, 6, and 13, an underdrain unit with a bottom wall that extends outwardly beyond sidewalls to define a flange. Perforations in the bottom wall help to secure the underdrain to the floor of the filter basin by engaging with grouting material provided under the underdrain units. Referring to FIG. 6, an end wall of the filter unit is provided with a plurality of perforations that provide mechanical engagement with grouting material provided around the units.

U.S. Pat. No. 6,110,366 to Hunkele et al. discloses an anchor concept for securing an underdrain block to a filter floor. In particular, Hunkele discloses the use of anchors that comprise one or more widenings extending outwardly from a rib so as to form ledges that are embedded in grouting on a filter floor.

U.S. Pat. No. 3,110,667 to Stuppy and U.S. Pat. No. 4,619,765 to Roberts disclose filter block constructions in which a bottom wall of the filter block is defined with ridges or grooves.

SUMMARY OF THE INVENTION

In one embodiment, an underdrain filter block for use in draining and backwashing a filtering media in a filter bed includes a top wall, a pair of side walls extending from the top wall, and a bottom wall extending between the pair of side walls. The top wall, the pair of side walls, and the bottom wall define an upper portion and a lower portion. The lower portion includes a grout chamber having a plurality of openings defined by at least one of the bottom wall and the pair of side walls.

The grout chamber may be defined by a transverse wall extending from one of the pair of side walls to the other of the pair of side walls. The upper portion may include a primary chamber and at least one secondary chamber defined by a pair of angularly extending walls. The underdrain filter block may further include a plurality of ribs generally extending circumferentially along the pair of side walls and the bottom wall. The grout chamber may extend the full length of the underdrain filter block or may only extend a portion of the full length of the underdrain filter block. The grout chamber may be recessed inwardly relative to an outermost portion of the side walls. The upper portion may include a primary chamber and at least one secondary chamber defined by an arched wall. The lower portion may include a plurality of grout chambers defined by a grid-like structure positioned on a bottom surface of the bottom wall with the bottom wall defining a plurality of openings that extend into each of the plurality of grout chambers, respectively. The plurality of openings may be circular-shaped.

In another embodiment, an underdrain filter block for use in draining and backwashing a filtering media in a filter bed includes a top wall, a pair of side walls extending from the top wall, a bottom wall extending between the pair of side walls, a plurality of ribs extending circumferentially along the pair of side walls and the bottom wall, and a plurality of wall segments extending between the plurality of ribs to define a plurality of grout chambers. The plurality of grout chambers may be positioned below the bottom wall. The plurality of wall segments may each define a plurality of openings. The underdrain filter block may further include a primary chamber and at least one second chamber defined by an arched wall.

In a further embodiment, a method of installing an underdrain filter block includes positioning an underdrain filter block adjacent to a filter floor. The underdrain filter block has a grout chamber at a lower portion of the block and the block has a pair of side surfaces and a bottom surface. The grout chamber includes a plurality of openings defined by at least one of the bottom surface and the pair of side surfaces of the block. The method further includes providing grout along the pair of side surfaces and the bottom surface such that grout extends into the plurality of openings.

The grout may be provided along the bottom surface of the block by positioning a section of leveling grout on the filter floor. The plurality of openings may be defined by the bottom surface and the pair of side surfaces of the block with the openings in the bottom surface and the pair of side surfaces each receiving grout. The underdrain filter block may be positioned onto the section of leveling grout on the filter floor. The grout may be provided along the pair of side surfaces of the underdrain filter block after positioning the underdrain filter block onto the section of leveling grout.

DESCRIPTION OF THE PREFERRED EMBODIMENTS

For purposes of the description hereinafter, spatial orientation terms, if used, shall relate to the referenced embodiment as it is oriented in the accompanying drawing figures or otherwise described in the following detailed description. However, it is to be understood that the embodiments described hereinafter may assume many alternative variations and embodiments. It is also to be understood that the specific devices illustrated in the accompanying drawing figures and described herein are simply exemplary and should not be considered as limiting.

Figure 1:
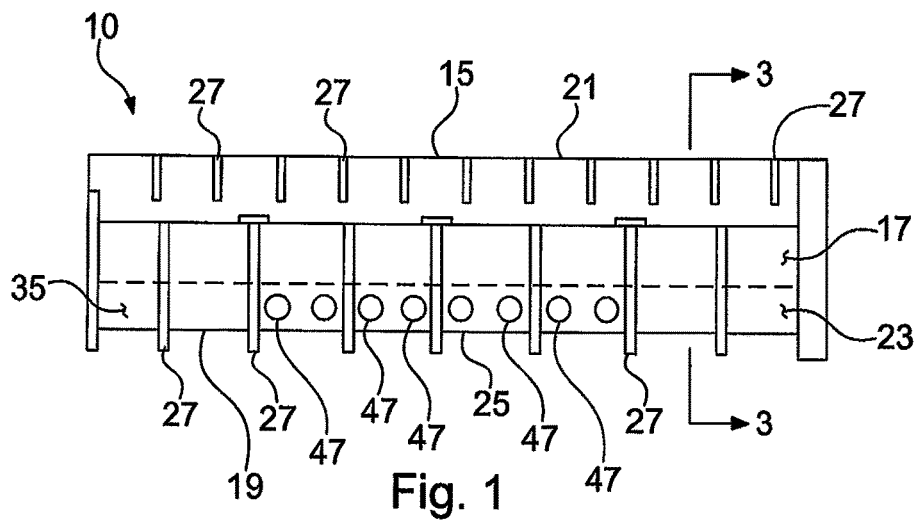
FIG. 1 is a front view of an underdrain filter block according to one embodiment of the present invention.
Figure 2:
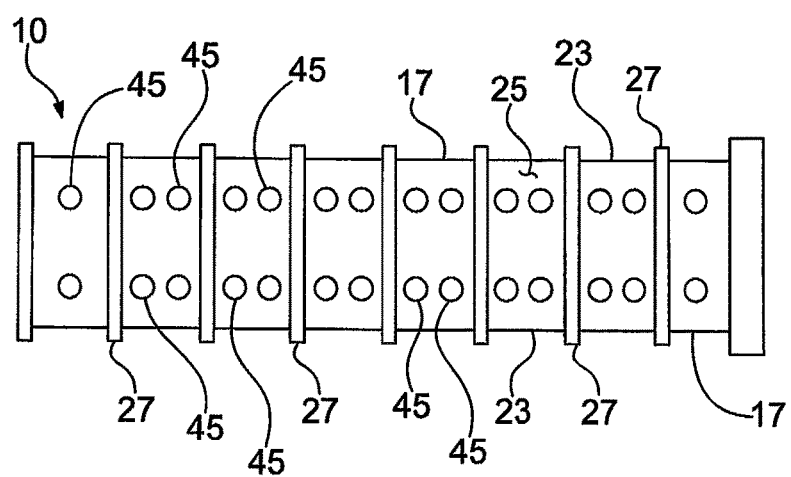
FIG. 2 is a bottom view of the filter block of FIG. 1.
Figure 3:
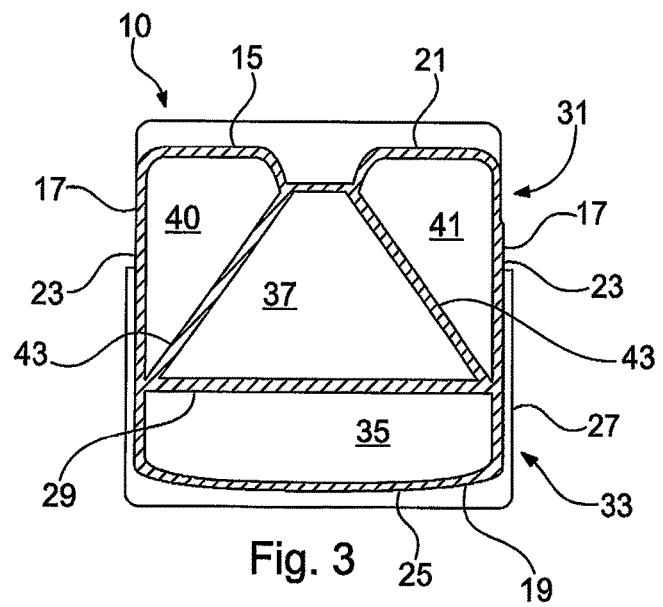
FIG. 3 is an enlarged cross-sectional view of the filter block along the line 3-3 shown in FIG. 1.

Referring to FIGS. 1-3, one embodiment of an underdrain filter block 10 includes a top wall 15, a pair of side walls 17, and a bottom wall 19, which define a top surface 21, side surfaces 23, and a bottom surface 25, respectively. The block 10 includes a plurality of reinforcing ribs 27 on the exterior surface of the walls 15, 17, 19. The ribs 27 are generally oriented circumferentially around the block 10 rather than along a longitudinal axis of the block, although other rib orientations and configurations may be utilized. The ribs 27 on the top wall 15 are separate or discontinuous from the ribs positioned on the bottom wall 19, although a single rib that extends circumferentially around the block 10 may be utilized. As shown in FIG. 3, a transverse interior wall 29 extends from one side wall 17 to the other side wall 17 to divide the interior of block 10 into an upper portion 31 and a lower portion 33. The top wall 15 defines a recessed portion that extends along a longitudinal axis of the block 10. The side walls 17 are generally planar, although the side walls 17 may include recessed portions such that the width of the block 10 in cross-section is narrower in certain areas. The ends of the block 10 are configured to receive respective ends of adjacent blocks so that a plurality of underdrain filter blocks may be secured end-to-end.

The lower portion 33 of the block 10 includes a grout chamber 35 defined by the transverse wall 29, side walls 17, and bottom wall 19. The grout chamber 35 is open at each end of the block 10, although the chamber 35 may be closed at one or both ends. The grout chamber 35 extends longitudinally along the full length of the block 10, although the chamber 35 may have a length shorter than the full length of the block 10. The upper portion 31 of the block 10 includes a primary chamber 37 and a pair of secondary chambers 40, 41 defined by a pair of angularly extending walls 43. Rather than providing the substantially planar angularly extending walls 43, the interior walls that define the primary chamber 37 and the secondary chambers 40, 41 may be arched or curved such as those shown, for example, in FIGS. 6 and 7 discussed below. The top wall 15 and the angularly extending walls 43 define a plurality of orifices (not shown) to provide for the distribution of liquid and gas as known in conventional underdrain filter blocks.

The bottom wall 19 of the filter block 10 defines a plurality of openings 45 that extend into the grout chamber 35. Each of the side walls 17 also define a plurality of openings 47 in the lower portion 33 of the block 10 with the openings 47 extending into the grout chamber 35. The openings 47 in the side walls 17 are not provided for the full length of the block 10, but may be provided for the full length of the block 10 in other configurations. Although the side walls 17 and bottom wall 19 include openings 45, 47, the side walls 17, or the bottom wall 19, may alternatively not include openings. Further, the side walls 17 and the bottom wall 19 may not be provided with openings that extend into the grout chamber 35. In such an arrangement, the block 10 may be provided with a grout introduction scoop (not shown) that is in fluid communication with the grout chamber 35. Furthermore, the openings 45, 47 are substantially circular-shaped, but may have other configurations such as being oblong-shaped, square-shaped, or any other suitable shape. The grout chamber 35 may be formed integrally with the block 10 to define a unitary, one-piece construction. The grout chamber 35 may also be formed from multiple pieces. In particular, the grout chamber 35 may be formed separately and secured to the rest of the block 10 through a fastening arrangement, such as by bolts or welding.

Figure 4:
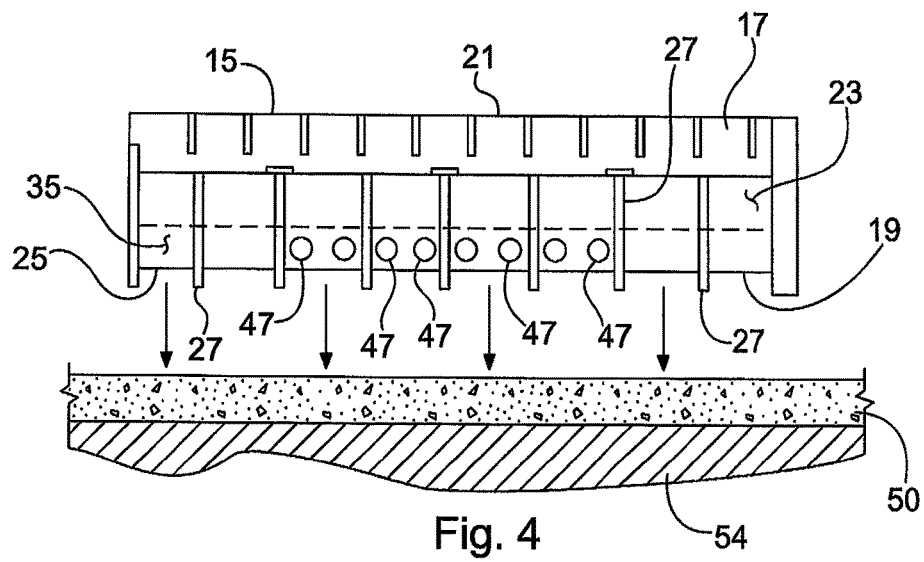
FIG. 4 is a front view of the filter block of FIG. 1, showing the filter block being laid on the base grout.
Figure 5:
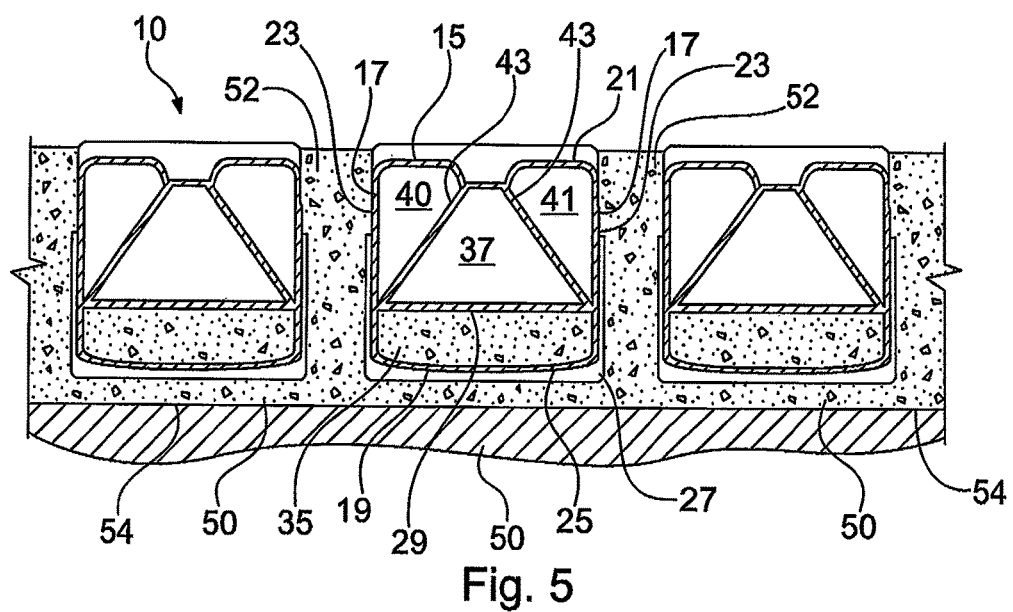
FIG. 5 is an enlarged cross-sectional view of a plurality of filter blocks shown in FIG. 1, showing the filter blocks installed.

Referring to FIGS. 4 and 5, during the installation process, the block 10 is secured in place by grout 50, 52 which flows into the grout chamber 35 through the openings 45, 47 in the side walls 17 and the bottom wall 19. The grout 50, 52 also flows around the grout chamber 35 and the block 10 up toward the top of the side walls 17 of the block 10.

In one embodiment, the underdrain filter block 10 is installed as generally shown in FIGS. 4 and 5. In particular, as shown in FIG. 4, the block 10 is positioned or set in leveling grout 50 provided on a filter floor 54. The leveling grout 50 protrudes into the grout chamber 35 slightly via the openings 45 in the bottom wall 19. Once the leveling grout 50 has set up enough, the side grout 52 is applied. During the installation of the side grout 52, the grout chamber 35 on the lower portion 33 of the block 10 is at least partially filled with grout. As shown in FIG. 5, the entire grout chamber 35 may be filled with grout after installation. The protrusion of the grout from the openings 45, 47 in the grout chamber 35 holds the block 10 securely in place, thereby overcoming the buoyant forces acting on the block 10. Furthermore, the underdrain filter block 10, particularly the bottom wall 19 of the block 10, is stiffened by the grout 50, 52 that enters the grout chamber 35. The stiffening of the bottom wall 19 and the block 10 reduces deflection or deformation of the block 10 due to the internal pressure. Thus, the grout chamber 35 and the openings 45, 47 prevent uplift failure due to the internal pressure caused by headloss through the block 10 and securely hold the filter block 10 on the filter floor 54. In a further embodiment, the filter block 10 is installed by securely holding the block 10 with top and bottom supports (not shown) and installing grout between the bottom wall 19 of the block 10 and the filter floor 54 and along the side walls 17 of the block 10 within a short time frame.

Figure 6:
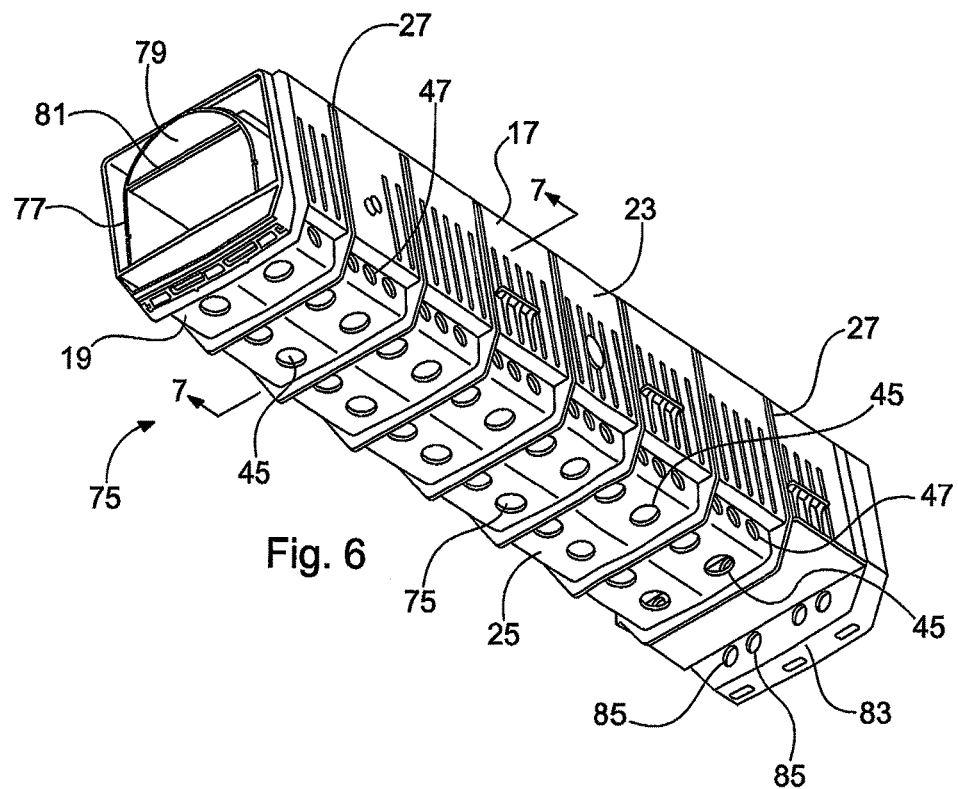
FIG. 6 is a perspective view of an underdrain filter block according to a second embodiment of the present invention.
Figure 7:
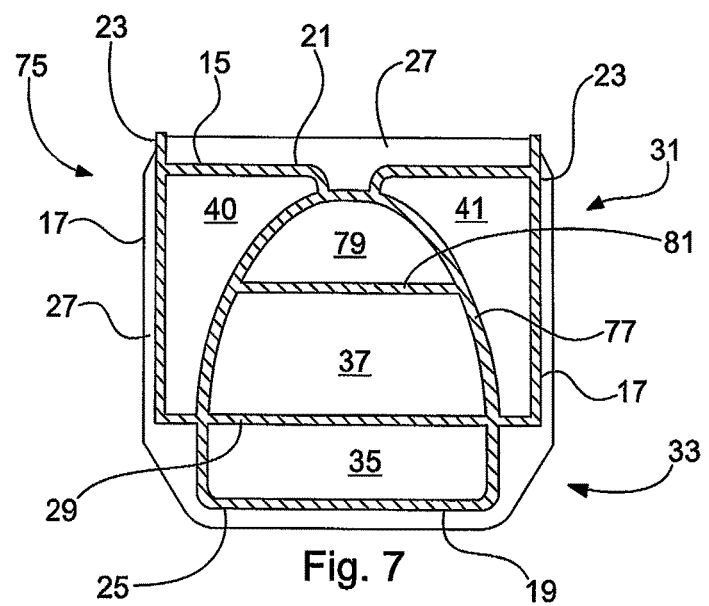
FIG. 7 is an enlarged cross-sectional view of the filter block along the line 7-7 shown in FIG. 6.

Referring to FIGS. 6 and 7, an underdrain filter block 75 according to a second embodiment is shown. The underdrain filter block 75 is similar to the underdrain block 10 as shown in FIGS. 1-5 and discussed above. Like reference numerals are used for like parts. The underdrain block 75 of the present embodiment also includes a top wall 15, a pair of side walls 17, and a bottom wall 19, which define a top surface 21, side surfaces 23, and a bottom surface 25, respectively. The block includes a plurality of reinforcing ribs 27 on the exterior surface of the top wall 15, side walls 17, and bottom wall 19. The ribs 27 generally extend circumferentially around the block with the ribs 27 on the top wall 15 being discontinuous as they extend from the top wall 15 to the side wall 17. The ribs 27, however, extend continuously from the side walls 17 to the bottom wall 19. A transverse wall 29 extends from one side wall 17 to the other side wall 17 to divide the interior of block 75 into an upper portion 31 and a lower portion 33. The lower portion 33 of the block 75 includes a grout chamber 35 defined by the transverse wall 29, side walls 17, and bottom wall 19. The grout chamber 35 only extends a portion of the full length of the block 75. Further, each of the side walls 17 are recessed inwardly where the transverse wall 29 begins. Thus, the grout chamber 35 is recessed compared to the outermost portion of the side walls 17.

Referring again to FIGS. 6 and 7, the upper portion 31 of the block 75 includes a primary chamber 37 and a pair of secondary chambers 40, 41 defined by an interior arched wall 77 extending from the transverse wall 29 and connecting to the top wall 15. A gas conduit 79 is defined by the arched wall 77 and a second transverse wall 81. The top wall 15, arched wall 77, and second transverse wall 81 define a plurality of orifices (not shown) to provide for the distribution of liquid and gas. The bottom wall 19 of the filter block 10 defines a plurality of openings 45 that extend into the grout chamber 35. The side walls 17 also define a plurality of openings 47 in the lower portion 33 of the block 75 with the openings 47 extending into the grout chamber 35. As shown in FIG. 6, the block 75 includes an end connector portion 83 that defines a plurality of openings 85. The openings 85 extend through the end connector portion 83 in a direction that is parallel to a longitudinal axis of the block 75. The end connector portion 83 may be utilized to secure a plurality of blocks 75 end-to-end as discussed above in connection with the block 10 shown in FIGS. 1-5. The block 75 may be installed in a similar manner as described above in connection with the block 10 shown in FIGS. 1-5.

Figure 8:
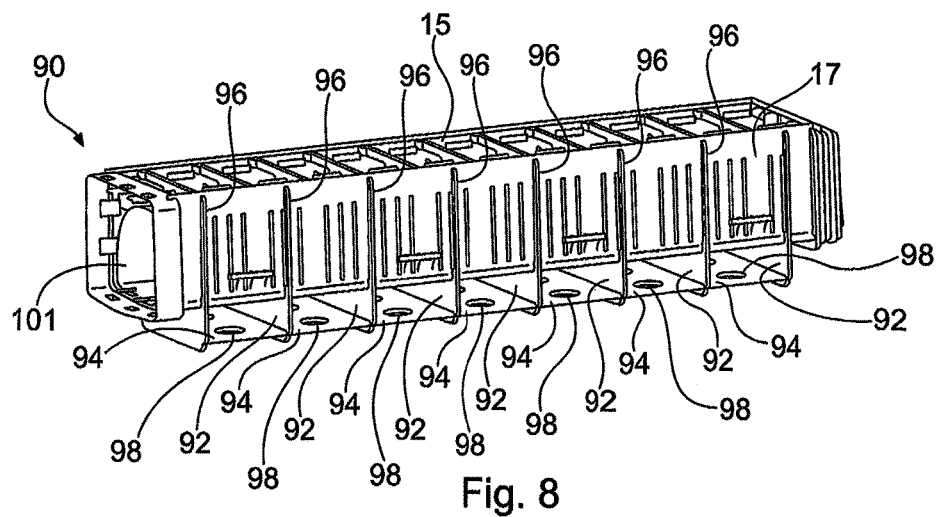
FIG. 8 is a perspective view of an underdrain filter block according to a third embodiment of the present invention.

Referring to FIG. 8, an underdrain filter block 90 according to a third embodiment is shown. The underdrain filter block 90 is similar to the underdrain block 10 as shown in FIGS. 1-5 and discussed above. Like reference numerals are used for like parts. The underdrain filter block 90 includes a plurality of grout chambers 92 defined by wall segments 94 positioned between ribs 96 that extend from a bottom surface of the transverse wall 29. The wall segments 94 extend longitudinally between the ribs 96. Thus, the grout chambers 92 are defined by the ribs 96 and the wall segments 94. The wall segments 94 each define a plurality of openings 98 for receiving grout as discussed above in connection with the openings 45 of the underdrain filter block 10 shown in FIGS. 1-5. The interior 101 of the block 90 may be similar to the upper portions 31 of the underdrain filter blocks 10, 75 discussed above having angularly extending walls or an arched wall to define primary and secondary conduits. The block 90 may be installed in a similar manner as described above in connection with the block 10 shown in FIGS. 1-5 with the open sides of the grout chambers 92 receiving grout rather than the openings 47 of the block 10.

Figure 9:
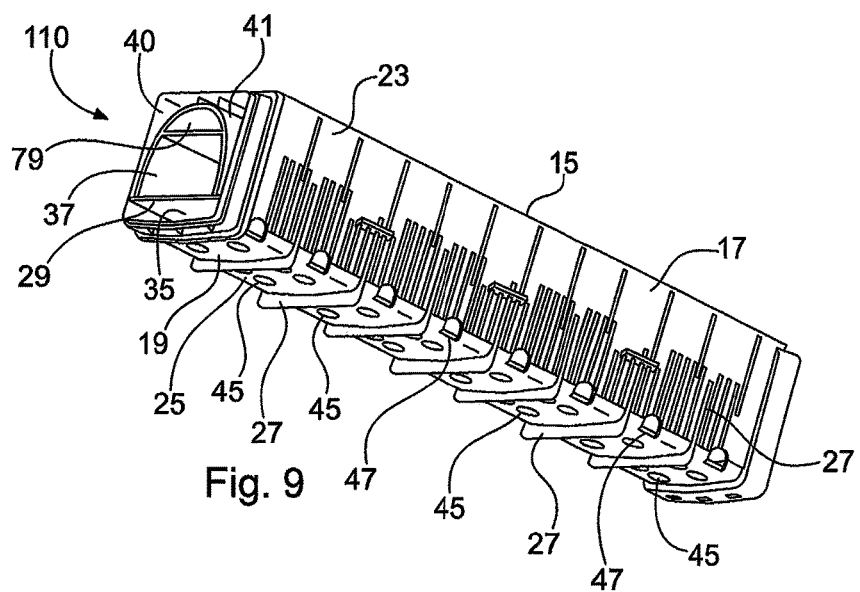
FIG. 9 is a perspective view of an underdrain filter block according to a fourth embodiment of the present invention.

Referring to FIG. 9, an underdrain filter block 110 according to a fourth embodiment is shown. The underdrain filter block 110 is similar to the underdrain block 10 as shown in FIGS. 1-5 and discussed above. Like reference numerals are used for like parts. The underdrain filter block 110 includes openings 45 in a bottom wall 19 and openings 47 in each of the side walls 17 similarly to the underdrain filter block 10 of FIGS. 1-5. The openings 47 of the underdrain filter block 110, however, are positioned at a location where the side walls 17 join the bottom wall 19 such that the openings 47 are non-circular. In particular, the openings 47 of the underdrain filter block 110 have an upper circular portion with a generally-planar bottom portion. The block 110 may be installed in a similar manner as described above in connection with the block 10 shown in FIGS. 1-5.

Figure 10:
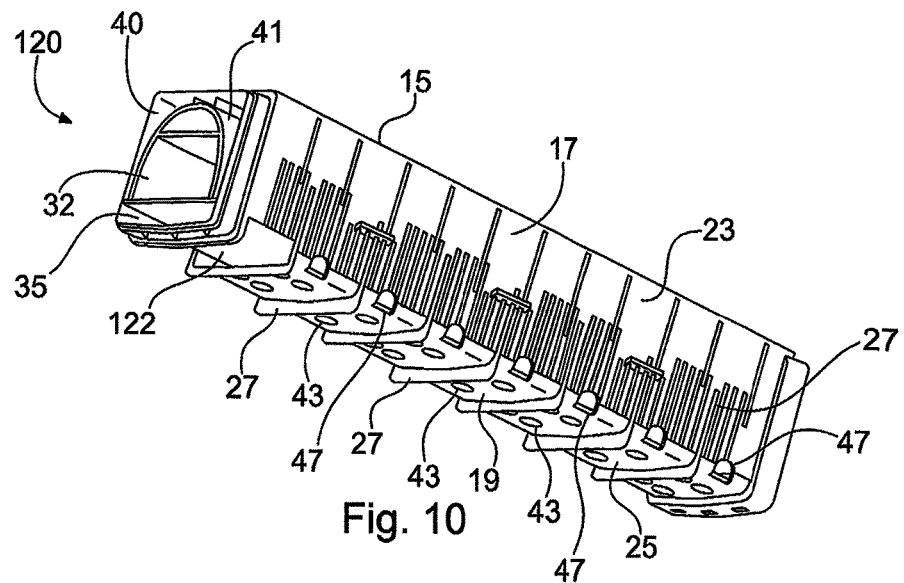
FIG. 10 is a perspective view of an underdrain filter block according to a fifth embodiment of the present invention.

Referring to FIG. 10, an underdrain filter block 120 according to a fifth embodiment is shown. The underdrain filter block 120 is similar to the underdrain block 10 as shown in FIGS. 1-5 and discussed above. Like reference numerals are used for like parts. The underdrain filter block 120 includes a grout chamber 35 that does not extend the full length of the block 120 thereby defining a cutout 122 adjacent to an end of the block 120. The openings 47 in the side walls 17 of the underdrain filter block 120 are similar to those described above in connection with the underdrain filter block 110 shown in FIG. 9. The cutout 122 is configured to receive a support structure (not shown). For example, the cutout 122 may receive a uni-strut. The block 120 may be installed in a similar manner as described above in connection with the block 10 shown in FIGS. 1-5.

Figure 11:
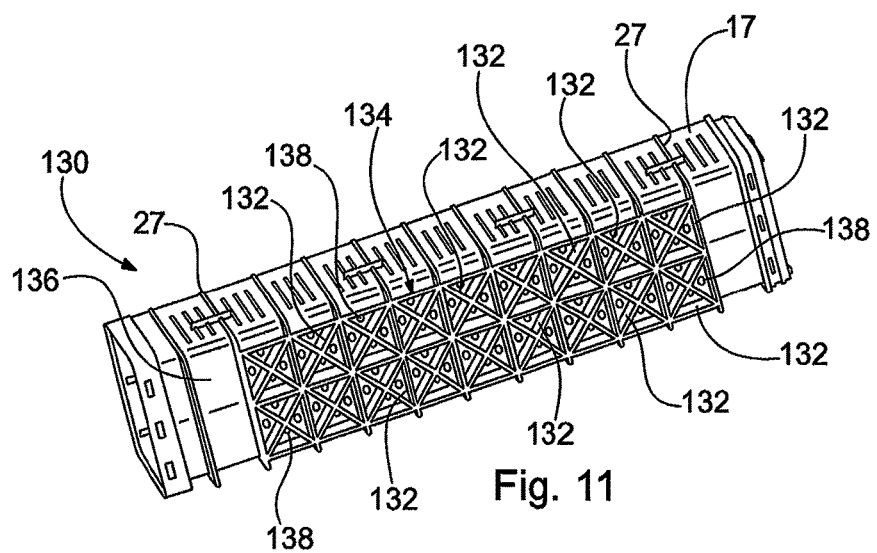
FIG. 11 is a perspective view of an underdrain filter block according to a sixth embodiment of the present invention.

Referring to FIG. 11, an underdrain filter block 130 according to a sixth embodiment is shown. The underdrain filter block 130 is similar to the underdrain block 10 as shown in FIGS. 1-5 and discussed above. Like reference numerals are used for like parts. The underdrain filter block 130 includes a plurality of grout chambers 132 defined by a grid-like structure 134 positioned on a bottom surface 136 of the underdrain filter block 130. The bottom surface 136 of the block 130 defines a plurality of openings 138 that extend into each of the grout chambers 132. The grid-like structure 134 strengthens the block 130 to limit deflection or deformation of the bottom surface 136. Further, the grout chambers 132 each receive grout in a similar manner as described above in connection with the grout chamber 35 of the underdrain filter block 10 shown in FIGS. 1-5. The openings 138 allow air to evacuate to ensure that the grout chambers 132 fill with grout, which further stiffens and strengthens the block 130. The block 130 may be installed in a similar manner as described above in connection with the block 10 shown in FIGS. 1-5.

This invention has been described with reference to the preferred embodiments. Obvious modifications and alterations will occur to others upon reading and understanding the preceding detailed description. It is intended that the invention be construed as including all such modifications and alterations.

The invention claimed is:

1. An underdrain filter block comprising:
   a top wall;
   a pair of side walls extending from the top wall;
   a transverse wall extending between the pair of side walls;
   first and second ribs each extending downwardly from the transverse wall across an entire width of the transverse wall from one of the pair of side walls to the other of the pair of side walls, wherein the first and second ribs are continuously joined to a bottom surface of the transverse wall across the entire width of the transverse wall; and
   a wall segment below the transverse wall extending from the first rib to the second rib to define a grout chamber configured to receive grout during installation of the underdrain filter block.

2. The underdrain filter block of claim 1, wherein the first and second ribs extend along the pair of side walls.

3. The underdrain filter block of claim 1, wherein the first and second ribs are two of a plurality of ribs, the wall segment is one of a plurality of wall segments, and the grout chamber is one of a plurality of grout chambers, each of the plurality of wall segments extending between respective ribs of the plurality of ribs to define one of the plurality of grout chambers.

4. The underdrain filter block of claim 3, wherein each of the plurality of ribs extend along the pair of side walls.

5. The underdrain filter block of claim 4, wherein each of the plurality of ribs extend along the transverse wall.

6. The underdrain filter block of claim 3, wherein each of the plurality of ribs extend along the transverse wall.

7. The underdrain filter block of claim 1, wherein the wall segment defines a plurality of openings.

8. The underdrain filter block of claim 1, wherein the top wall, the pair of side walls, the transverse wall, and at least one diagonal wall define a primary chamber and at least one secondary chamber.

9. The underdrain filter block of claim 1, wherein the transverse wall is imperforate.

10. An underdrain filter block comprising:
a top wall;
a pair of side walls extending from the top wall;
a transverse wall extending between the pair of side walls;
first and second ribs each joined to a bottom surface of the transverse wall between the pair of side walls, each of the first rib and the second rib extending downwardly from the transverse wall across a width of the transverse wall from one of the pair of side walls to the other of the pair of side walls; and
a wall segment below the transverse wall extending from the first rib to the second rib to define a grout chamber configured to receive grout during installation of the underdrain filter block.

11. The underdrain filter block of claim 10, wherein the first and second ribs extend along the pair of side walls.

12. The underdrain filter block of claim 10, wherein the first and second ribs are two of a plurality of ribs, the wall segment is one of a plurality of wall segments, and the grout chamber is one of a plurality of grout chambers, each of the plurality of wall segments extending between respective ribs of the plurality of ribs to define one of the plurality of grout chambers.

13. The underdrain filter block of claim 12, wherein each of the plurality of ribs extend along the pair of side walls.

14. The underdrain filter block of claim 13, wherein each of the plurality of ribs extend along the transverse wall.

15. The underdrain filter block of claim 12, wherein each of the plurality of ribs extend along the transverse wall.

16. The underdrain filter block of claim 10, wherein the wall segment defines a plurality of openings.

17. The underdrain filter block of claim 10, wherein the top wall, the pair of side walls, the transverse wall, and at least one diagonal wall define a primary chamber and at least one secondary chamber.

18. The underdrain filter block of claim 10, wherein the transverse wall is imperforate.

* * * * *